April 3, 1934. P. H. CHASE 1,953,893
CABLE
Filed Nov. 4, 1929 2 Sheets-Sheet 1
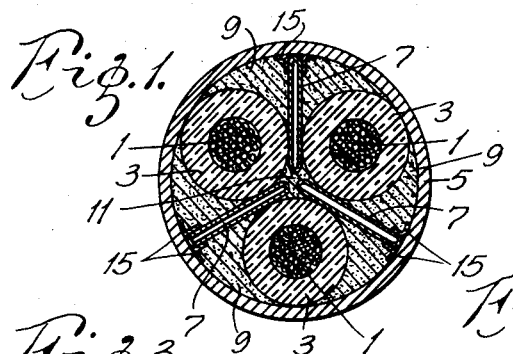
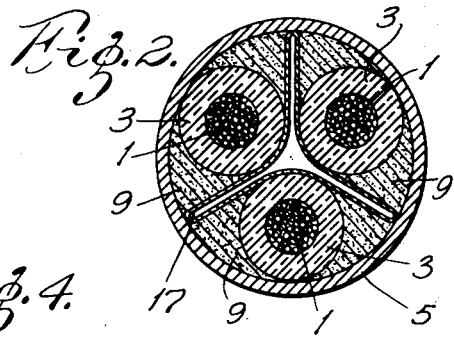
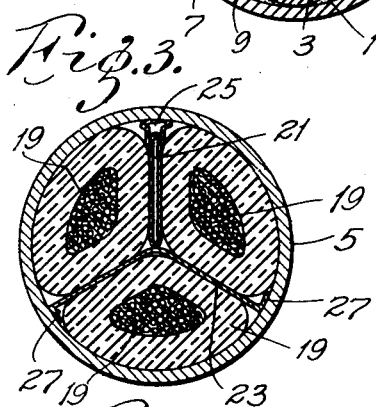
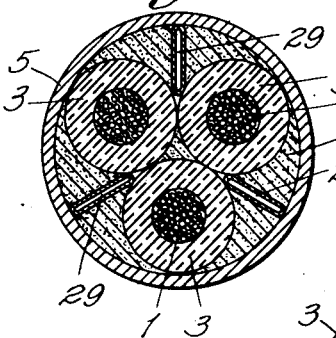
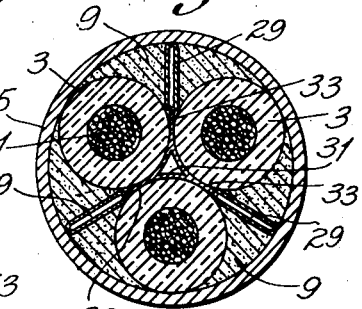
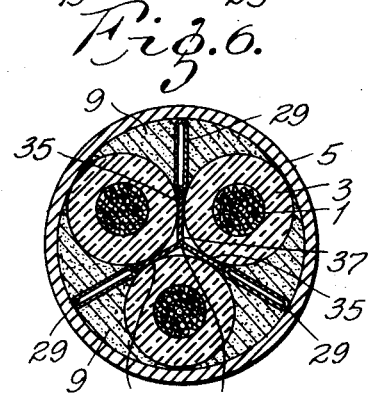
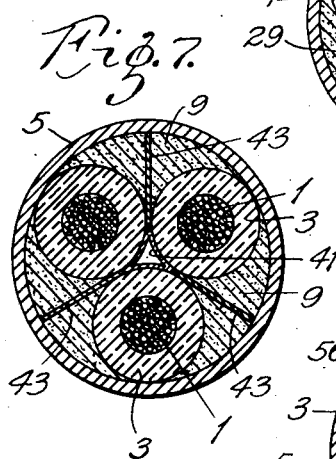
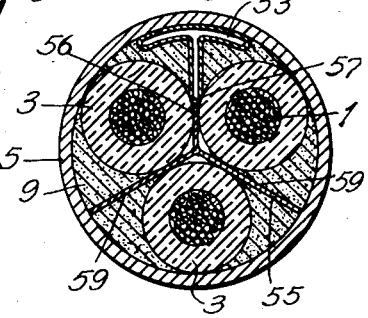
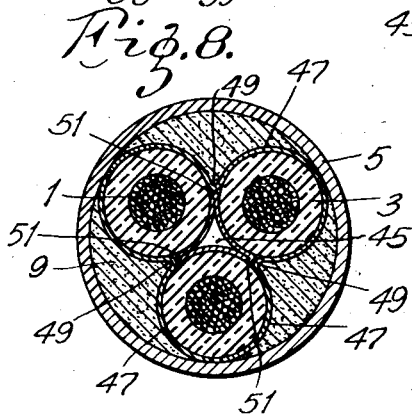
Philip H. Chase.
Inventor April 3, 1934.   P. H. CHASE   1,953,893
CABLE
Filed Nov. 4, 1929   2 Sheets-Sheet 2
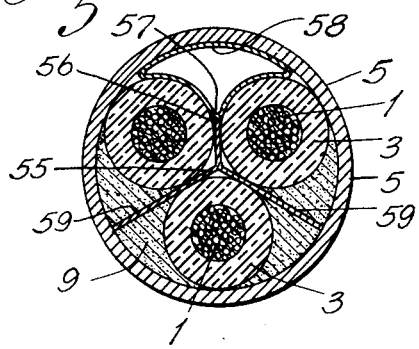
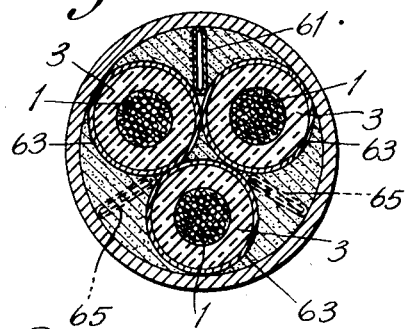
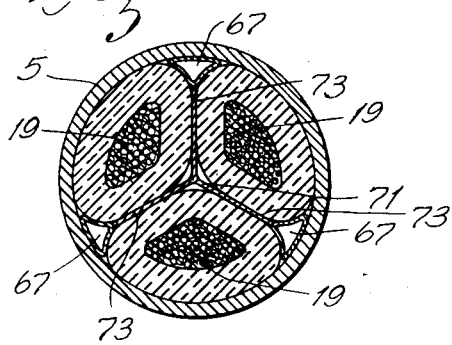
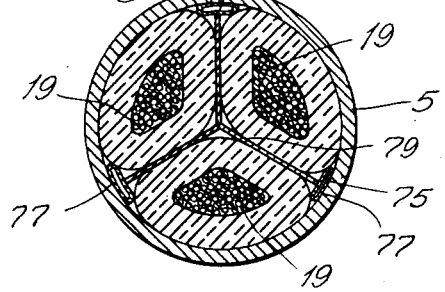
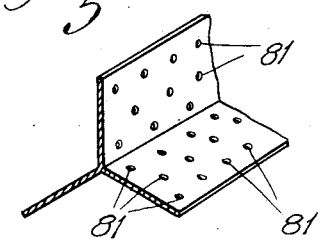
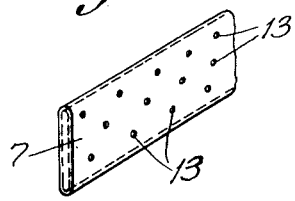

Patented Apr. 3, 1934

1,953,893

UNITED STATES PATENT OFFICE 1,953,893

CABLE

Philip H. Chase, Bala-Cynwyd, Pa.

Application November 4, 1929, Serial No. 404,605

15 Claims. (Cl. 173—266)

This invention relates to cables, and with regard to certain more specific features, to electric cables having expansion members therein.

Among the objects of the invention may be noted the provision of an improved fluid-containing member in a cable adapted to relieve and/or compensate for pressure changes; the provision of an expansion device in a cable which will facilitate the conduction of heat from the interior of the cable to the exterior thereof; the provision within a cable of electrostatic shields for controlling the stresses in the insulation with which the shields are associated; the provision of shields of the class described adapted to be used with or to be used as expansion devices; and the provision of a durable electrical shield within a cable so constructed and located that it also serves at least in part to control hydrostatic pressures within the cable and also to increase the thermal conductivity from the conductors to the sheath. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated several of various possible embodiments of the invention, Figs. 1 to 13 are cross sections of cable showing various forms of the invention;

Fig. 14 is a fragmentary trimetric view showing a foraminous shield; and,

Fig. 15 is a view, similar to Fig. 14, showing a foraminous expansion member.

Similar reference characters indicate corresponding parts throughout the several views of the drawings.

Referring now more particularly to Fig. 1, there is illustrated a three-conductor cable, in which the conductors (round in the present embodiment) are designated by numeral 1, the insulation by numeral 3, and the overall lead sheath by numeral 5. Radially disposed between the insulated conductors are metallic expansion members or hollow tubes designated by numerals 7, composed preferably of copper or other metal of relatively high heat conductivity. The width of the tubes is substantially equal to the radial distance from the center of the cable to the sheath thereof. The lateral spaces designated by numeral 9 and the central space designated by numeral 11, are preferably filled with solid filler material. The voids in the conductors 1, insulation 3 and fillers 9, 11 are preferably entirely filled with a suitable insulating compound or oil.

If the hollow tubes or expansion members 7 are constructed with walls impervious to the impregnating compound or oil, they may contain either a gaseous or a liquid fluid, and will be constructed of a suitable strong, flexible material. They may comprise a series of separated, closed hollow tubes, or may be continuous and/or connected to each other and/or to reservoirs, expansion tanks or openings to the outside air, preferably at cable joints at suitable intervals throughout the length of the cable. As the temperature of the different parts of the cable changes and there is a difference in the rate of expansion of those parts, with a relatively inelastic outer sheath, there is a change in the hydrostatic pressure on the impregnating compound or oil 9 and consequently on the walls of the hollow tubes 7. When the external pressure on the walls of the hollow tubes 7 is greater than the internal pressure therein, the walls will move inwardly, thus reducing the area of cross section of the hollow tubes 7. Conversely, when the external pressure on the walls of the hollow tubes is less than the internal pressure, the walls will move outwardly, thus increasing the area of cross section. The deflection of the walls of the hollow tubes 7 will continue until there is partial or substantial equalization of pressure.

If the medium in the closed hollow tubes 7 is a gaseous fluid, and the tubes do not communicate to reservoirs, or expansion tanks or openings to the outside air, the gas will be compressed to a smaller volume by a decrease of cross section of the hollow tubes and will expand to a greater volume by an increase of cross section, with respectively inverse changes in pressure. If the hollow tubes 7 contain liquid fluid, they will preferably connect into reservoirs or expansion tanks. Such reservoirs or expansion tanks, or openings to the outside air, may be utilized with the gas-filled tubes, if the tubes are continuous or are connected to each other. With such reservoirs, or expansion tanks or openings to the outside air, part of the fluid in the hollow tubes will pass lengthwise of the cable (with or without substantial compression in the case of gaseous mediums) from or into the cable as the pressure within the cable is greater or less than in the reservoirs or expansion tanks, (or openings to the outside air in the case of gaseous mediums), until the pressures become substantially equalized.

In case the hollow tubes 7 are made pervious to the impregnating compound or oil, for example, such as by means of perforations 13 (see Fig. 15) or slits through the walls, the impregnating compound or oil will also occupy the internal cross section of the tubes. The tubes 7 then serve as compound or oil channels longitudinally of the cable, connecting into reservoirs or expansion tanks. As the temperature of the different parts of the cable changes and there is a difference in the rate of expansion of these parts, there is a change in the hydrostatic pressure on the impregnating compound or oil. When the pressure within the cable is greater than that in the reservoirs, compound or oil passes through the openings 13, along in the walls of the hollow tubes and thence lengthwise of the cable into the reservoirs until the pressures in the reservoirs and in the cable become substantially equalized. Conversely, when the pressure in the reservoirs is greater than that in the cable, compound or oil passes from the reservoirs into the hollow tubes within the cable and through the openings along in the walls of the hollow tubes back into the body proper of the cable, until the pressures in the reservoirs and in the cable become substantially equalized.

The three tubes 7 are of sufficient width to extend radially from near the geometrical axis of the cable to or closely approaching the outer sheath 5. On the surface of the outer edges of the filter spaces 9, adjacent to the outer ends of the hollow tubes 7 are formed L-shaped cleats 15, composed of thin metal. These cleats 15 are in contact with the outer sheath 5 and with the side walls of the hollow tubes. These cleats 15 afford substantial low-resistance electrical and thermal paths between the walls of the hollow tubes 7 and the outer sheath 5. Although two cleats 15 are shown in connection with each hollow tube, under many conditions one cleat is sufficient. The cleats may be entirely omitted under other conditions, as for example, when the tubes and sheath have metallic tapes or wires associated therewith functioning as heat conductors.

The inner edges of the hollow tubes preferably closely approach one another and may be put into contact, although such contact is not necessary and may be undesirable, as, for example, when movement of the tubes 7 is to be provided for.

It is apparent from the foregoing, that the expansion members or hollow tubes, which provide means for pressure compensation, constitute radial paths of high heat conductivity from near the axis of the cable to the outer sheath and also serve as electrostatic shields at sheath potential between the three conductors. Thus there is effected a descending temperature gradient of the insulation toward that of the outer sheath. Also the temperature difference between the conductors and the sheath is reduced. If desired, the cable can be operated at higher voltages and/or currents. The electrostatic shielding afforded converts the cable electrically to three single-conductor cables and avoids the disadvantages incident to the rotating electrostatic field in unshielded, multiple conductor, polyphase cables. The formation of voids and the reduction of pressures to the ionization point are minimized by the control and compensation of pressures by means of the hollow tubing. The resultant effect of the control of pressure, temperature difference and electrical stresses is to permit the operation of the cable at high temperatures, over wide temperature ranges and under high electrical stress.

Fig. 2 illustrates a cable construction similar to Fig. 1 except that a single trifurcated expansion tube 17 is used instead of the three flat tubes 7 of Fig. 1 and the cleats 15 of Fig. 1 are omitted.

Fig. 3 illustrates a construction having sector-shaped conductors 19, one hollow tube 21 between a pair of the insulated conductors, and a plain (non-hollow) shield 23 replacing two of the hollow tubes 7 of Fig. 1. A U-shaped cleat 25 affords thermal and electrical contact with the outer sheath, the legs of the U being in contact with the sides of the hollow tube 21 and the base in contact with the outer sheath 5. L-shaped edges or flanges 27 on the plain shield serve a similar purpose.

Fig. 4 illustrates the use of three narrow tubes 29 extending radially inward from the outer sheath approximately to the line of contact between the surface of the insulated conductors. Lesser degrees of heat conduction and electrostatic shielding are afforded but many of the advantages are nevertheless secured with these narrower tubes.

Fig. 5 illustrates three narrow hollow tubes 29 similar to those shown in Fig. 4, with a trifurcated shield 31, the legs 33 of which extend inwardly along the surface of the conductor insulation toward the axis of the cable. The outer ends of these legs or cusps are in contact with the hollow tubes 29. The construction in Fig. 6 is similar to that of Fig. 5, except that the legs 35 of the shield 37 extend radially inward to the geometric center 39 of the cable.

In Fig. 7 is illustrated a cable construction with a trifurcated hollow tube 41 near the geometrical center of the cable and flat shields 43 in contact at cusps with the hollow tube 41, said flat shields 43 extending radially to the outer sheath. A similar but larger hollow tube 45 is shown in Fig. 8 with curved, bifurcated shields 47 extending to the outer sheath along the surfaces of the conductor insulation. The cusps 49 of the shields 47 contact the cusps 51 of the tube 45.

Fig. 9 illustrates a trifurcated hollow tube 53 in one of the lateral spaces and a trifurcated shield 55 with unequal legs radially disposed between the three insulated conductors. The shorter leg 56 is in contact with the inner edge 57 of the hollow tube and the outer edges of the equal longer legs 59 are in contact with the outer sheath 5. In Fig. 9 the hollow tube is shown as T-shaped and occupies only a portion of the lateral space. The bar of the T is arcuate and surface contacts the sheath 5, while the stem is radially located.

In Fig. 10 is shown a form similar to that of Fig. 9, except that the hollow tube 58 has a more or less triangular shape, rather than a T-shape, so that it occupies all of the lateral space in the cable, rather than only a fraction thereof as in the Fig. 9 form.

In Fig. 11 is illustrated a cable construction with one flat hollow tube 61 located in one of the lateral spaces. The shields, designated by numeral 63, extend entirely around the periphery of the insulated conductors. It is to be understood that more than one tube 61 may be used, as indicated by dotted lines at numerals 65.

Fig. 12 illustrates a cable construction with sector-shaped conductors 19 and trifurcated hollow tubes 67 in the lateral spaces. A trifurcated shield 71 is positioned similarly to the one shown in Fig. 6, except that the legs 73 thereof are longer.

In Fig. 13 is illustrated a cable with sector-shaped conductors 19 and flat hollow tubes 75 with one side wall 77 in surface contact with the outer sheath, and a trifurcated shield designated by numeral 79. The ends of the legs in contact with the hollow tubes and the legs pass radially between the insulated conductors to the axis of the cable, as is the case in Fig. 12.

It is to be understood that in Figs. 1 to 13 the walls of the hollow tubes may be seamless or constructed with seams joined or unjoined and may be pervious or impervious to the passage of fluids.

The shields may be made of solid or of perforated metal. A pervious form of shield is shown in Fig. 14, wherein numeral 81 indicates foraminations or perforations permitting fluid flow. The L-shaped and U-shaped cleats of Figs. 1 and 3 and the L-shaped shield edges of Fig. 3 may be utilized with the constructions illustrated in Figs. 2 and Figs. 4 to 13.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a cable, a metallic sheath, a plurality of conductors therein, a plurality of radially arranged and relatively flat expansible tubes arranged between said conductors, said tubes being electrically joined with said sheath.

2. In a cable, a sheath, a plurality of conductors in said sheath, a plurality of expansible, heat conductive tubes arranged radially between said conductors and reaching from substantially the center of the cable to said sheath and high-heat-conductive means joining the tubes with the sheath, said high-heat-conductive means making an electrical contact.

3. In a cable, a metallic sheath, a plurality of conductors therein and at least one hollow member located between a pair of said conductors having radially arranged sides ultimately joining with said sheath, said hollow member being metallic.

4. In a cable, a sheath, a plurality of conductors therein, a radially arranged flat, expansible, heat conducting tube located between two of said conductors and at least one flat, heat conducting sheet radially arranged between two other of said conductors.

5. In a cable, a sheath, a plurality of conductors therein, a radially arranged flat, expansible, heat conducting tube located between two of said conductors and at least one flat, heat conducting sheet radially arranged between two other of said conductors, said tube and sheet being in electrical contact and means contacting each of them with said sheath.

6. In a cable, a sheath, a plurality of conductors therein, a metallic, hollow, expansible member at least in part flat and located in one lateral space between the conductors, said member forming part of an electrostatic shield and a heat conductive path, a non-hollow metallic means joining therewith and separating pairs of said conductors, said non-hollow member extending radially to contact with said hollow member to form an electrostatic shield and a further high-heat-conducting path.

7. A cable comprising a sheath, a plurality of conductors therein, hollow and relatively flat fluid containing members therein adapted to compensate for pressure changes, said containing members being positioned radially and having a relatively high heat conductivity and being connected to the sheath between conductors to provide electrostatic shielding.

8. A cable comprising a sheath, a plurality of conductors therein, fluid containing members therein having relatively flat portions and being adapted to compensate for pressure changes, said containing members having said flat portions positioned radially and having a relatively high heat conductivity and being connected to the sheath between conductors and to each other to provide electrostatic shielding.

9. A cable comprising a sheath, a plurality of conductors therein, at least one fluid containing member therein having a relatively flat portion and being adapted to compensate for pressure changes, said relatively flat portion radially connecting said containing member with the sheath over a path located between conductors, said member being composed of metal.

10. A cable comprising a sheath, a plurality of conductors therein, a relatively flat and radial fluid container member therein composed of high heat-conducting material adapted to compensate for pressure changes, and located between said conductors, and having radially arranged means joining with said sheath by way of heat conducting means.

11. In a cable, a metallic sheath, a plurality of conductors therein, and at least one radially arranged metallic and relatively flat expansible tube arranged between at least portions of the conductors peripherally considered, said metallic tube being electrically joined to said sheath.

12. In a cable, a metallic sheath, a plurality of conductors therein and at least one hollow member located between at least one pair of said conductors and having radially arranged sides ultimately joining with said sheath, said hollow member being metallic.

13. In a cable, a metallic sheath, a plurality of conductors therein, and at least one hollow metallic member having a plurality of flat portions, each of said flat portions being positioned between a pair of said conductors and having radially arranged sides ultimately joining with said sheath.

14. In a cable, a sheath, a plurality of conductors therein, a radially arranged flat, expansible, heat-conducting tube located between at least one pair of said conductors and a heat-conducting shield radially arranged between each of the other pairs of said conductors.

15. In a cable, a sheath, a plurality of conductors therein, a radially arranged flat, heat-conducting tube located between two of said conductors and at least one flat heat-conducting sheet radially arranged between two other of said conductors, said tube and sheet being in electrical contact and means contacting each of them with said sheath.

PHILIP H. CHASE.